United States Patent
Li et al.

(10) Patent No.: US 7,894,820 B2
(45) Date of Patent: *Feb. 22, 2011

(54) CHANNEL FEEDBACK USING CHANNEL STATE PREDICTIONS BASED ALSO ON DELAYS

(75) Inventors: Qinghua Li, Sunnyvale, CA (US); Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 853 days.

This patent is subject to a terminal disclaimer.

(21) Appl. No.: 11/617,434

(22) Filed: Dec. 28, 2006

(65) Prior Publication Data

US 2007/0254602 A1 Nov. 1, 2007

Related U.S. Application Data

(60) Provisional application No. 60/797,017, filed on May 1, 2006.

(51) Int. Cl.
*H04W 72/00* (2009.01)

(52) U.S. Cl. .................. 455/450; 455/447; 455/451; 455/452.1; 455/452.2; 455/453; 370/210; 370/329; 370/341; 370/431; 370/433; 375/240.05; 375/240.07; 375/240.08; 375/347

(58) Field of Classification Search ............... 455/447, 455/450, 451, 452.1–452.2, 453, 464; 370/208, 370/338, 465, 210, 329, 341, 431–433, 470; 375/240.05, 240.07, 240.08, 347

See application file for complete search history.

(56) References Cited

U.S. PATENT DOCUMENTS

| 7,403,745 | B2 * | 7/2008 | Dominique et al. ...... 455/67.11 |
| 7,548,730 | B2 | 6/2009 | Waxman |
| 2002/0023145 | A1 | 2/2002 | Orr et al. |
| 2003/0157900 | A1 | 8/2003 | Gaal et al. |
| 2004/0121774 | A1 * | 6/2004 | Rajkotia et al. ............... 455/441 |
| 2004/0162083 | A1 * | 8/2004 | Chen et al. .................. 455/454 |
| 2006/0018389 | A1 * | 1/2006 | Koorapaty et al. .......... 375/259 |
| 2006/0034165 | A1 * | 2/2006 | Levy .......................... 370/208 |
| 2007/0160011 | A1 * | 7/2007 | Kim et al. ................... 370/332 |

(Continued)

FOREIGN PATENT DOCUMENTS

WO 2004042982 A2 5/2004

(Continued)

OTHER PUBLICATIONS

International Search Report mailed on Sep. 28, 2007 for International Application No. PCT/US2007/067880, 6 pgs.

(Continued)

*Primary Examiner*—Wayne Cai
(74) *Attorney, Agent, or Firm*—Schwabe, Williamson & Wyatt, P.C.

(57) ABSTRACT

Embodiments of methods and apparatus for providing channel feedback information based at least in part on predicted future channel states is disclosed and described. In various embodiments, future channel states may be predicted based at least in part on received channel sounding signals, and amounts of delay in time in transmission and receipt between a subscriber station and a base station. Other embodiments may be described and claimed.

24 Claims, 6 Drawing Sheets

U.S. PATENT DOCUMENTS

2007/0254597 A1 11/2007 Li et al.
2009/0080504 A1 3/2009 Li et al.

FOREIGN PATENT DOCUMENTS

WO WO2004/042982 * 5/2004
WO 2006031485 A1 3/2006

OTHER PUBLICATIONS

Havish Koorapaty et al., "Delta Modulation for Channel Feedback in Transmit Diversity Systems," Vehicular Technology Conference 2005, VTC 2005-Spring, 2005 IEEE 61st May 30-Jun. 1, 2005, vol. 1, pp. 644-648.

International Search Report, issued in Application No. PCT/US2007/067901, mailed Sep. 27, 2007.

* cited by examiner

CHANNEL FEEDBACK USING CHANNEL STATE PREDICTIONS BASED ALSO ON DELAYS

RELATED APPLICATION

The is a non-provisional application of provisional application 60/797,017, entitled "Methods and Apparatus for Providing A Channel Quality Feedback System Based on Channel Prediction Associated with a Multiple-Input-Multiple-Output System," filed on May 1, 2006. The non-provisional application claims priority to the 60/797,017 provisional application.

TECHNICAL FIELD

The present disclosure relates generally to wireless communication systems, and more particularly, to methods and apparatus for providing channel feedback using channel state predictions based also on delays.

BACKGROUND

As wireless communication becomes more and more popular at offices, homes, schools, etc., different wireless technologies and applications may work in tandem to meet the demand for computing and communications at anytime and/or anywhere. For example, a variety of wireless communication networks may co-exist to provide a wireless environment with more computing and/or communication capability, greater mobility, and/or eventually seamless roaming.

In particular, wireless personal area networks (WPANs) may offer fast, short-distance connectivity within a relatively small space such as an office workspace or a room within a home. Wireless local area networks (WLANs) may provide broader range than WPANs within office buildings, homes, schools, etc. Wireless metropolitan area networks (WMANs) may cover a greater distance than WLANs by connecting, for example, buildings to one another over a broader geographic area. Wireless wide area networks (WWANs) may provide the broadest range as such networks are widely deployed in cellular infrastructure. Although each of the above-mentioned wireless communication networks may support different usages, co-existence among these networks may provide a more robust environment with anytime and anywhere connectivity.

DETAILED DESCRIPTION

In general, methods and apparatus for providing channel feedback based on channel state predictions are described herein. In various embodiments, the channel state predictions are also based on amount of delays. The methods and apparatus described herein are not limited in these regards.

Figure 1:
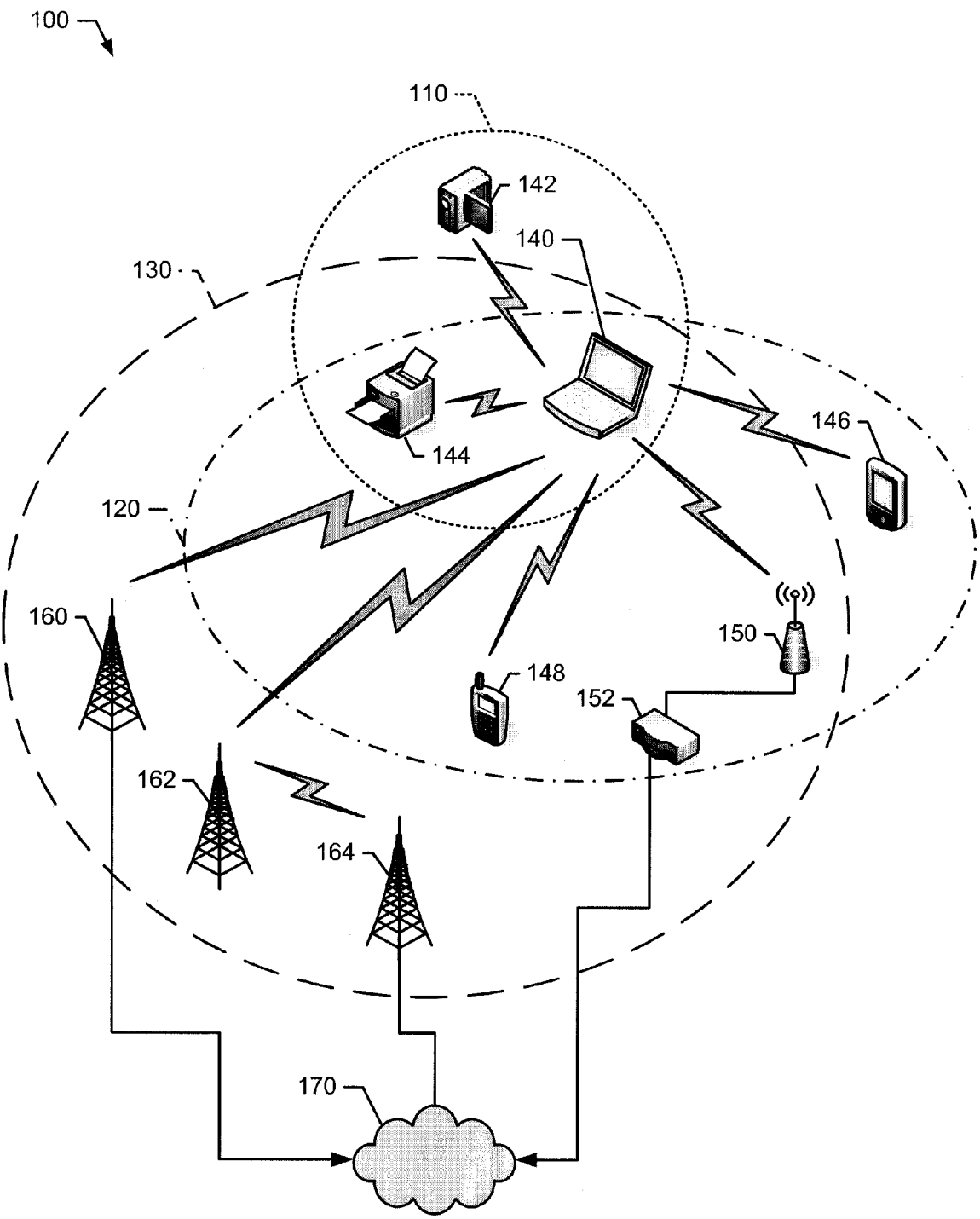
FIG. 1 is a schematic diagram representation of an example wireless communication system according to an embodiment of the methods and apparatus disclosed herein.

Referring to FIG. 1, an example wireless communication system 100 may include one or more wireless communication networks, generally shown as 110, 120, and 130. In particular, the wireless communication system 100 may include a wireless personal area network (WPAN) 110, a wireless local area network (WLAN) 120, and a wireless metropolitan area network (WMAN) 130. Although FIG. 1 depicts three wireless communication networks, the wireless communication system 100 may include additional or fewer wireless communication networks. For example, the wireless communication networks 100 may include additional WPANs, WLANs, and/or WMANs. The methods and apparatus described herein are not limited in this regard.

The wireless communication system 100 may also include one or more subscriber stations, generally shown as 140, 142, 144, 146, and 148. For example, the subscriber stations 140, 142, 144, 146, and 148 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts five subscriber stations, the wireless communication system 100 may include more or less subscriber stations.

The subscriber stations 140, 142, 144, 146, and 148 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless links. In one example, the laptop computer 140 may operate in accordance with suitable wireless communication protocols that require very low power such as Bluetooth®, ultra-wide band (UWB), and/or radio frequency identification (RFID) to implement the WPAN 110. In particular, the laptop computer 140 may communicate with devices associated with the WPAN 110 such as the video camera 142 and/or the printer 144 via wireless links.

In another example, the laptop computer 140 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the laptop computer 140 may communicate with devices associated with the WLAN 120 such as the printer 144, the handheld computer 146 and/or the smart phone 148 via wireless links. The laptop computer 140 may also communicate with an access point (AP) 150 via a wireless link. The AP 150 may be operatively coupled to a router 152 as described in further detail below. Alternatively, the AP 150 and the router 152 may be integrated into a single device (e.g., a wireless router).

The laptop computer 140 may use OFDM modulation to transmit large amounts of digital data by splitting a radio frequency signal into multiple small sub-signals, which in turn, are transmitted simultaneously at different frequencies. In particular, the laptop computer 140 may use OFDM modulation to implement the WMAN 130. For example, the laptop computer 140 may operate in accordance with the 802.16 family of standards developed by IEEE to provide for fixed, portable, and/or mobile broadband wireless access (BWA) networks (e.g., the IEEE std. 802.16-2004 (published Sep. 18, 2004), the IEEE std. 802.16e (published Feb. 28, 2006), the IEEE std. 802.16f (published Dec. 1, 2005), etc.) to communicate with base stations, generally shown as 160, 162, and 164, via wireless link(s).

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). The methods and apparatus described herein are not limited in this regard.

The WLAN 120 and WMAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 170 via the AP 150 and/or the router 152. In another example, the WMAN 130 may be operatively coupled to the common public or private network 170 via the base station(s) 160, 162, and/or 164.

The wireless communication system 100 may include other suitable wireless communication networks. For example, the wireless communication system 100 may include a wireless wide area network (WWAN) (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, Third Generation Partnership Project (3GPP) technology, standards based on these technologies, variations and evolutions of these standards, and/or other suitable wireless communication standards. Although FIG. 1 depicts a WPAN, a WLAN, and a WMAN, the wireless communication system 100 may include other combinations of WPANs, WLANs, WMANs, and/or WWANs. The methods and apparatus described herein are not limited in this regard.

The wireless communication system 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
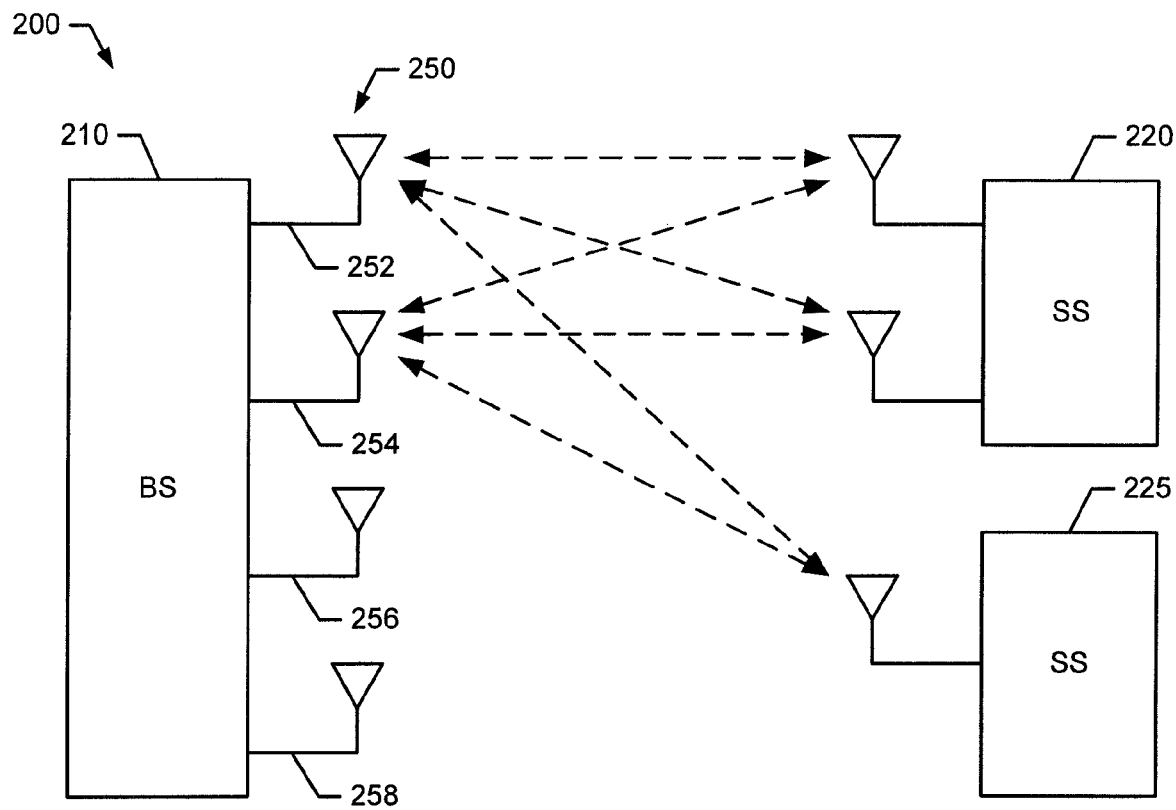
FIG. 2 is a block diagram representation of an example multiple-input-multiple-output (MIMO) system of the example wireless communication system of FIG. 1.

Referring to FIG. 2, an example wireless MIMO system 200 may include a base station 210 and one or more subscriber stations, generally shown as 220 and 225. The wireless MIMO system 200 may include a point-to-point MIMO system and/or a point-to-multiple point MIMO system. For example, a point-to-point MIMO system may include the base station 210 and the subscriber station 220. A point-to-multiple point MIMO system may include the base station 210 and the subscriber station 225. The base station 210 may transmit data streams to the subscriber stations 220, 225 simultaneously. For example, the base station 310 may transmit two data streams to the subscriber station 220 and one data stream to the subscriber station 225. Although FIG. 2 may depict one subscriber station, the wireless MIMO system 200 may include additional subscriber stations.

The base station 210 may transmit two or more data streams over four transmit antennas 250, generally shown as 252, 254, 256, and 258. Although FIG. 2 depicts four transmit antennas, the base station 210 may include additional or fewer transmit antennas. The methods and apparatus described herein are not limited in this regard.

Figure 3:
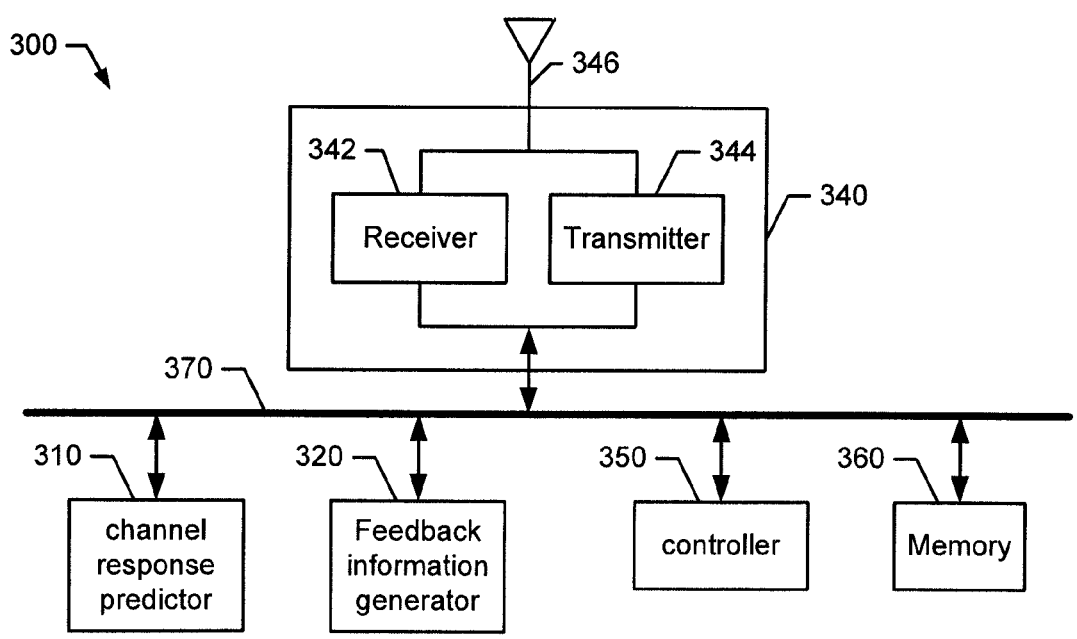
FIG. 3 is a block diagram representation of an example subscriber station of the example MIMO system of FIG. 2.

In the example of FIG. 3, the subscriber station 220 may include a channel response predictor 310, a feedback information generator 320, a network interface device (NID) 340, a processor 350, and a memory 360. The channel response predictor 310, the feedback information generator 320, the NID 340, the processor 350, and the memory 360 may be operatively coupled to each other via a bus 370. While FIG. 3 depicts components of the subscriber station 220 coupling to each other via the bus 370, these components may be operatively coupled to each other via other suitable direct or indirect connections (e.g., a point-to-point connection or a point-to-multiple point connection).

The NID 340 may include a receiver 342, a transmitter 344, and an antenna 346. The subscriber station 220 may receive and/or transmit data via the receiver 342 and the transmitter 344, respectively. The antenna 346 may include one or more directional or omni-directional antennas such as dipole antennas, monopole antennas, patch antennas, loop antennas, microstrip antennas, and/or other types of antennas suitable for transmission of radio frequency (RF) signals. Although FIG. 3 depicts a single antenna, the subscriber station 220 may include additional antennas. For example, the subscriber station 220 may include a plurality of antennas to implement a multiple-input-multiple-output (MIMO) system.

Although the components shown in FIG. 3 are depicted as separate blocks within the subscriber station 220, the functions performed by some of these blocks may be integrated within a single semiconductor circuit or may be implemented using two or more separate integrated circuits. For example, although the receiver 342 and the transmitter 344 are depicted as separate blocks within the NID 340, the receiver 342 may be integrated into the transmitter 344 (e.g., a transceiver). The methods and apparatus described herein are not limited in this regard.

Multiple-input multiple-output (MIMO) precoding (or closed-loop MIMO) is supported by IEEE std. 802.16e, where the base station sounds the channel and the subscriber station feeds back the channel state information (or beamforming matrixes). Since the frame duration of 802.16e is usually about 5 ms, a large latency about 10 ms is induced between the channel sounding and the actual beamforming. Since the channel state may change significantly during the interval especially for mobile channels, the feedback delay significantly limits the application of closed-loop MIMO to mobile subscribers experiencing time varying fading channels, whom 802.16e network are designed for. Simulation results from several companies in an IEEE harmonization group of closed-loop MIMO demonstrate that closed loop MIMO of 16e loses almost all performance gain when subscriber speed is 10 km/h, though closed-loop MIMO has 4-5 dB over open loop MIMO when subscriber speed is below 3 km/h.

In general, embodiments of the invention employ one or both solutions to retain the gain of closed loop MIMO for high speed. First, after receiving the sounding (or periodic pilot) symbols, the subscriber station predicts future channel state a few millisecond (say 10 ms) latter and feeds back the predicted channel state information or the predicted beamforming matrixes. Secondly, the base station may perform (additional) prediction based on the fed back information from the subscriber station before conducting the actual beamforming since an additional delay may be added by the base station. Simulation results demonstrate that the varying channel can be predicted by a simple 5-tap FIR filter with error below 20%. With this prediction technique, the 2-4 dB gain can be obtained over the system without channel prediction.

The channel prediction can also be used in generation channel quality (CQI) feedback to compensate for the feedback delay. In the simulation of 3GPP LTE, CQI feedback is used for link adaptation, which selects scheme for modulation, code rate, MIMO multiplexing/diversity, number of streams (i.e. rank control), etc. The delay due to receiver feedback and transmitter processing causes mismatches between the current channel state and fed back state, and thus causes performance loss. In various embodiments, the feedback is generated from the predicted channel to compensate for the total delay. The feedback recipient (e.g. Node B or base station) may specify the total delay and the feedback provider (e.g. UE or mobile station) may predict the channel response after the specified delay and generate feedback according to the predicted channel response. In various embodiments, e.g. WiMAX, after the preamble of each frame (more precisely downlink subframe), the MAC (Media Access) header is broadcasted to subscriber stations (SS). The MAC header has the resource allocation for the next frame. Therefore, the SS knows the exact location (in terms of time and frequency) of the allocated resource that carries its data. Thus, the feedback delay can be exactly computed by the SS that computes the feedback and can be compensated accordingly.

Figure 4:
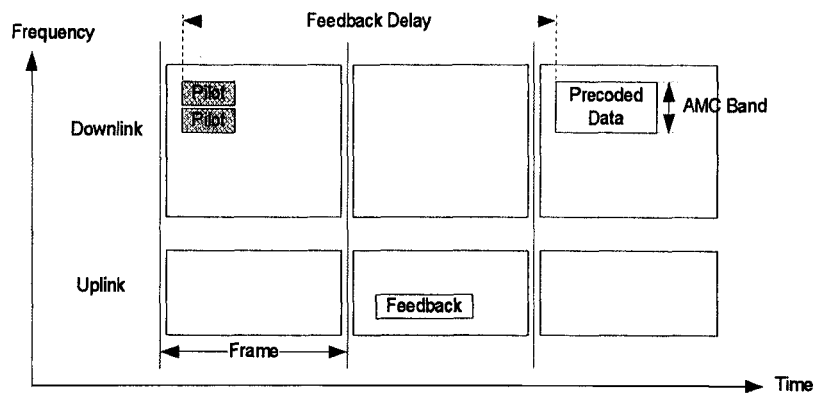
FIG. 4 illustrates a frame structure of Band AMC in FDD mode.

For one example, to mitigate the impact of feedback delay, subscriber station (SS) can predict the channel response two frames ahead and select the precoding matrix based on the predicted channel. The resource allocation information of the next frame is broadcasted at the very beginning of the current downlink subframe. The SS can predict the channel response at the allocated resource block and send the feedback in the current uplink subframe as illustrated in FIG. 4. For another example, the feedback delay in the previous example may be reduced. Within the second frame in FIG. 4, Node B allocates a precoded data transmission in the downlink after the feedback in the uplink, then the feedback and precoding based on the feedback can be within the same frame and feedback delay reduces to one frame. FIG. 4 illustrates an example frame structure of adaptive modulation and coding (AMC) band in frequency division duplex (FDD) mode.

Figure 5:
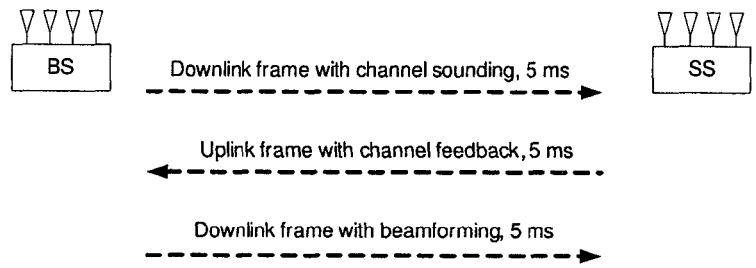
FIG. 5 is a block diagram representation of example delays.
Figure 6:
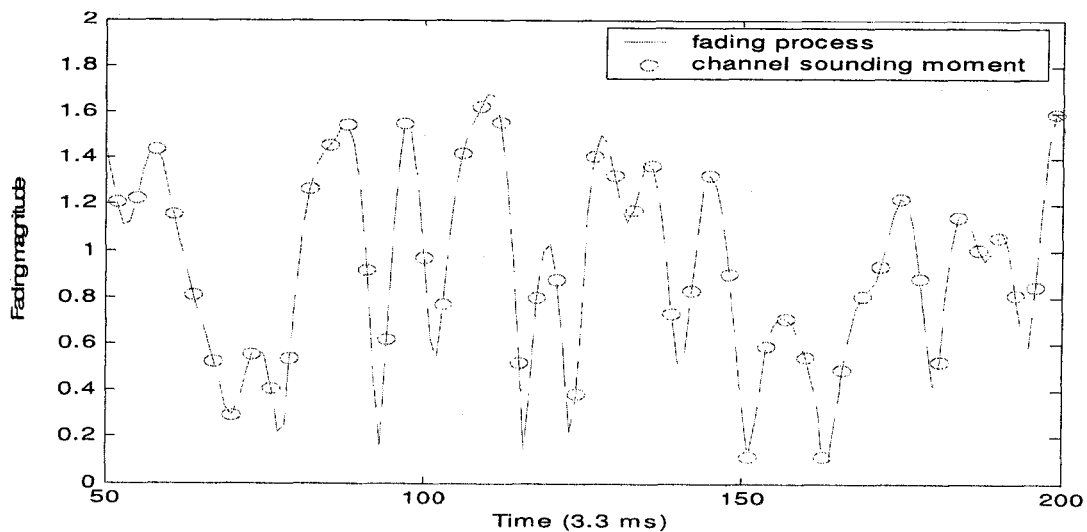
FIG. 6 depicts time varying fading channel and effect of feedback delay.

Multiple-input multiple-output (MIMO) preceding (or closed-loop MIMO) is supported by IEEE std. 802.16e, where the base station sounds the channel and the subscriber station feeds back the channel state information (or beamforming matrixes) for both FDD and TDD modes. Since the frame duration of 802.16e is usually about 5 ms, a large latency about 10 ms is induced between the channel sounding and the actual beamforming as shown in FIG. 5. The delay may even be greater than 10 ms for the end part of the beam formed packet. Since the channel state may change significantly during the interval especially for mobile channels as shown in FIG. 6. It can be seen from the figure that interval channel can substantially change after each 10 ms. If a closed-loop MIMO transmitter conducts beamforming using obsolete channel information the formed beam is not likely to pointing to the desired direction. Therefore, the feedback delay significantly limits the application of closed-loop MIMO to mobile subscribers experiencing time varying fading channels, whom 802.16e network are designed for. Simulation results from several companies in an IEEE harmonization group of closed-loop MIMO demonstrate that closed loop MIMO of 16e loses almost all performance gain when subscriber speed is 10 km/h, though closed-loop MIMO has 4-5 dB over open loop MIMO when subscriber speed is below 3 km/h.

Figure 7:
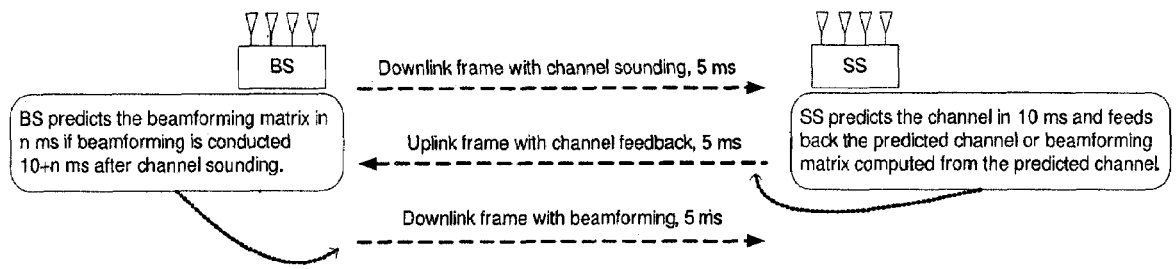
FIG. 7 is a block diagram representation of a feedback system based on channel state predictions that are also based on delays.

Since the fading Doppler is relatively slow compared to 10 ms sampling rate, channel sounding responses received at the mobile station are correlated. Channel response in 10 ms should be able to be predicted using previous channel responses. In various embodiments, two solutions are employed to retain the gain of closed loop MIMO for high speed as follows. First, after receiving the channel sounding (or periodic pilot) symbols, the subscriber station predicts the future channel state in a few millisecond (say 10 ms) and feeds back the predicted channel state information or the predicted beamforming matrixes computed from the predicted channel. Secondly, the base station may perform (additional) prediction based on the fed back information from the subscriber station before conducting the actual beamforming since an additional processing delay may be added by the base station. As described herein, a CQI feedback system based on channel prediction is illustrated in FIG. 7.

Figure 8:
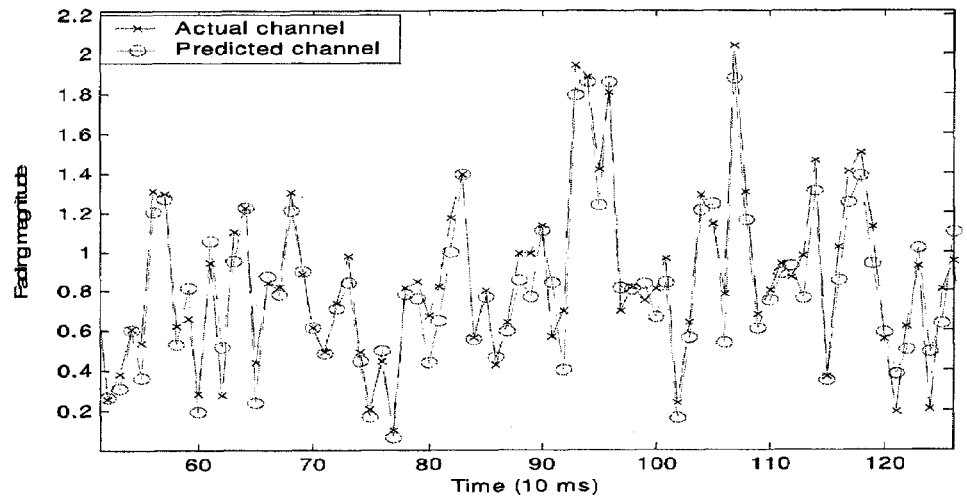
FIG. 8 depicts an example performance of a channel predictor.
Figure 9A:
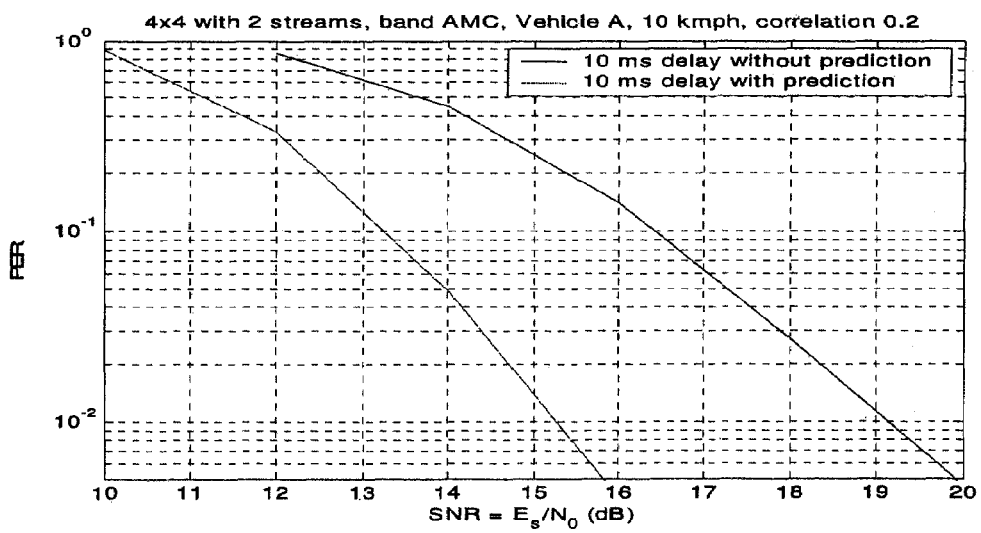
FIG. 9a depicts example packet error rates for systems with and without channel prediction, for an example amount of delay.

Simulation results demonstrate that the varying channel can be predicted by a simple 5-tap FIR filter with error below 20% as shown in FIG. 8. With this prediction technique, the 2-4 dB gain can be obtained over the system without channel prediction as shown in FIGS. 8 and 9a, where the mobile speed is 10 km/h. The inputs to the 5-tap filter are 5 previous channel responses estimated from the preambles of the previous 5 frame. The filter is derived with low complexities from 5 autocorrelation coefficients of the fading process, which computed from previous preambles. The filter is a linear one-step predictor, which is essentially a special kind of Wiener-Hopf filter. Using a more sophisticated estimator such as MUSIC (Multiple Signal Classification), vehicle speeds greater than 10 km/h can be tolerated.

Figure 9B:
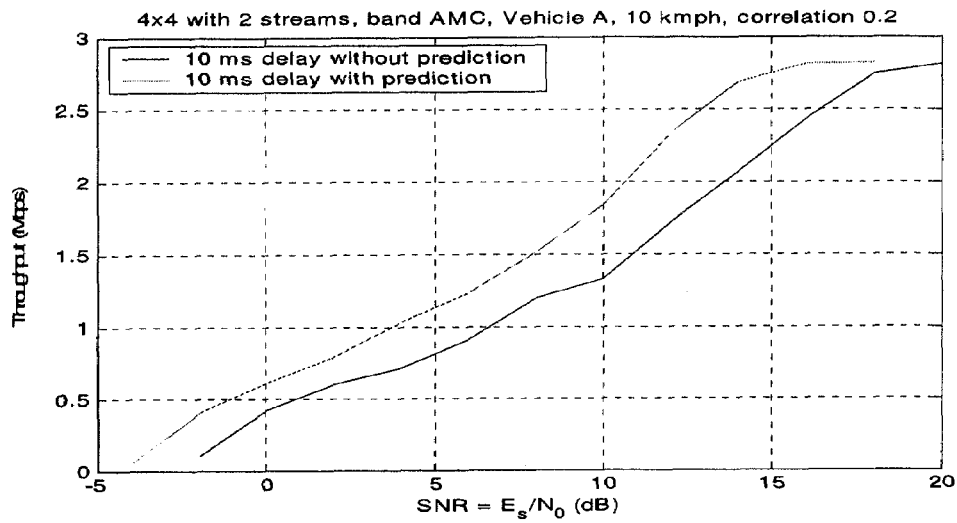
FIG. 9b depicts example throughputs for systems with and without channel prediction, for an example amount of delay.

In the example of FIG. 9b, example system throughputs contrasting the embodiments with or without the employment of channel state prediction is illustrated.

As a result, the methods and apparatus described herein may enable the application of closed-loop MIMO of 802.16e to mobile subscribers. The proposed channel prediction technique is the most efficient solution for mobile channels among those discussed in an IEEE harmonization group for 802.16e closed-loop MIMO.

Figure 10:
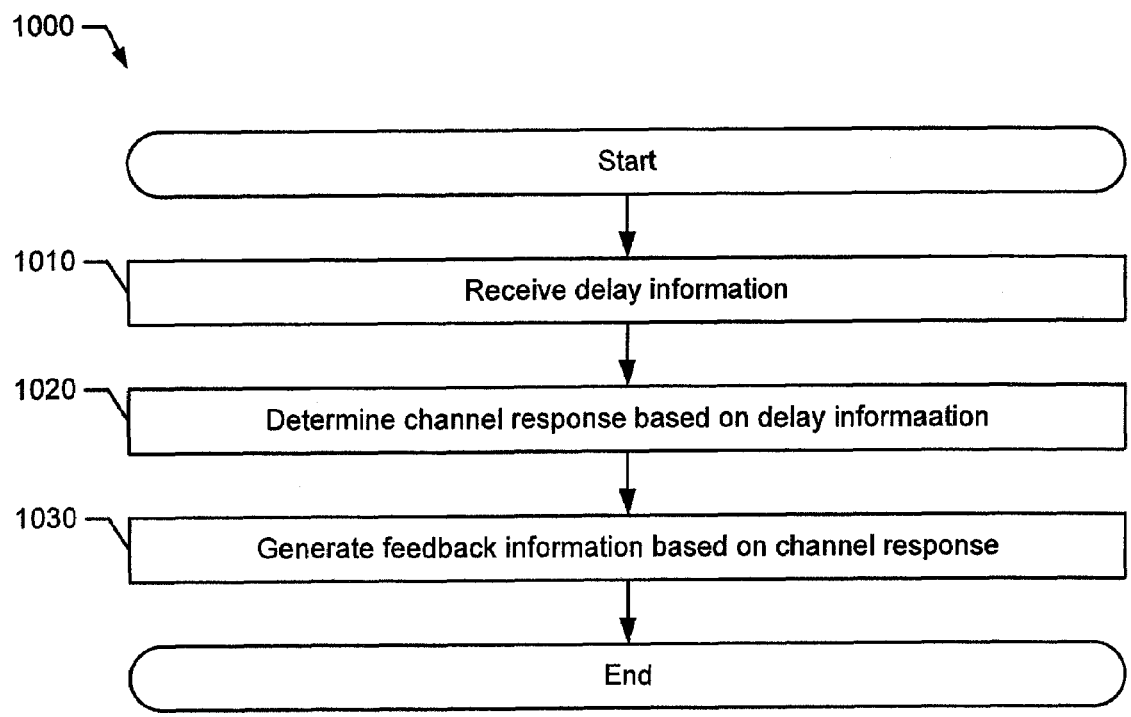
FIG. 10 is a flow diagram representation of one manner in which the example feedback system of FIG. 6 may operate.

FIG. 10 depicts one manner in which the base station 210 and the subscriber station 220 of FIG. 2 may be configured to provide a CQI feedback system for single codeword associated with a MIMO system. The example process 1000 of FIG. 10 may be implemented as machine-accessible instructions utilizing any of many different programming codes stored on any combination of machine-accessible media such as a volatile or non-volatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 10, these actions may be performed in other temporal sequences. Again, the example process 1000 are merely provided and described in conjunction with the system of FIG. 2 as an example to provide a CQI feedback system based on channel prediction.

In the example of FIG. 10, the process 1000 may begin with the subscriber station receiving delay information, e.g. the delay in the subscriber station receiving channel sounding signals from the base station, and/or the delay in the base station in receiving channel feedback information provided back from the subscriber station to the base station, 1010. Thereafter, the subscriber station may determine channel response (i.e. predicting future channel states) based on channel sounding signals received from the base station, and the amounts of delays for transmission and receipt between the base station and the subscriber station, 1020. On predictions of the future channel states, the subscriber station may generate channel feedback information based on the channel state predictions, 1030.

Although the methods and apparatus described herein may be associated with the Third Generation Partnership Project (3GPP) for the Long Term Evolution (LTE), the methods and apparatus described herein may be readily applicable with other suitable wireless technologies, protocols, and/or standards. The methods and apparatus described herein are not limited in this regard.

Figure 11:
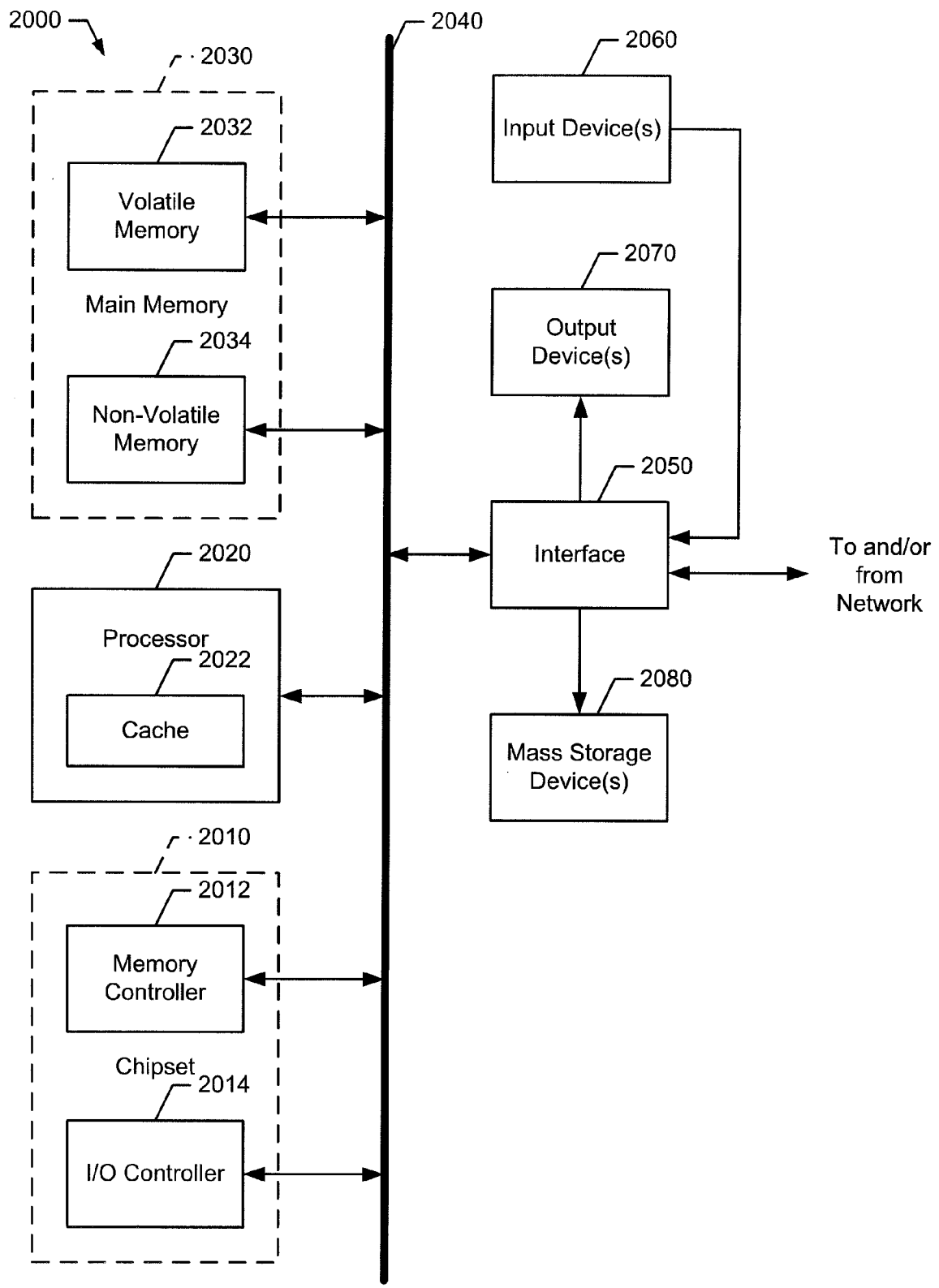
FIG. 11 is a block diagram representation of an example processor system that may be used to implement the example subscriber station of FIG. 3.

FIG. 11 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 11 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc. In various embodiments, the interface circuit 2050 provides wireless network connection, wherein the included communication device is incorporated with the teachings of the invention described earlier with respect to predicting future channel states, taking into account amount of delays between the system and a base station, generating channel feedback information, and providing the channel feedback information to the base station. In other embodiments, portions of the teachings may be endowed to other components, including but not limited to I/O controller 2014.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 11 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. An apparatus comprising:
a channel response predictor to predict one or more future channel states based on received channel sounding signals from a transmitter station and a delay specified by the transmitter station, the delay corresponding to one or more time slots in which respective ones of the one or more future channel states are predicted;
a feedback information generator coupled to the channel response predictor to generate channel feedback information based on the predicted future channel state(s); and
a network interface device coupled to the channel response predictor and the feedback information generator to receive the channel sounding signals from the transmitter station, and to transmit the generated channel feedback information to the transmitter station.

2. The apparatus of claim 1, wherein the channel response predictor is further configured to estimate feedback delay and to predict the one or more future channel states based on the estimated feedback delay.

3. The apparatus of claim 1, wherein the channel response predictor comprises one or more finite impulse response filters configured to predict the one or more future channel states.

4. The apparatus of claim 1, wherein the channel response predictor comprises one or more spectral estimators configured to predict the one or more future channel states.

5. The apparatus of claim 1, wherein the channel response predictor is further configured to predict one or more future channel states based on resource allocation information for a future frame within a MAC header of a current frame.

6. The apparatus of claim 1, wherein the channel feedback information includes a beamforming matrix.

7. The apparatus of claim 1, wherein the channel feedback information comprises channel quality information.

8. An article of manufacture comprising:
a storage medium; and
a plurality of instructions stored therein, the instructions configured to program a component to enable the component
to predict for a first station hosting the component, one or more future channel states, based on channel sounding signals received by the first station from a second station and a delay specified by the second station, the delay corresponding to one or more time slots in which respective ones of the one or more future channel states are predicted, and
to generate for the first station for transmission back to the second station, channel feedback information, based on the predicted future channel states.

9. The article of claim 8, wherein the programming instructions are designed to predict the future channel states using finite impulse response filtering.

10. The article of claim 8, wherein the programming instructions are designed to predict the future channel states using spectral estimation.

11. A method comprising:
transmitting by a base station, channel sounding signals, to a subscriber station;
receiving by the base station, channel feedback information, from the subscriber station, the channel feedback information having been generated based on one or more future channel states predicted based on the channel sounding signals received by the subscriber station; and
predicting by the base station, one or more additional future channel states based on the received channel feedback information and an additional delay added by the base station, the delay based on an amount of time associated with processing the channel feedback information.

12. The method of claim 11, wherein the generation of the channel feedback information is further based on an amount of delay in time in the subscriber station receiving the channel sounding signals, and another amount of delay in time in the base station receiving channel feedback information provided back to the base station.

13. The method of claim 11, wherein the predicting comprises predicting by the base station, future channel states, using spectral estimation.

14. The method of claim 11, further comprising the base station performing beamforming based on the future channel states predicted by the base station.

15. The method of claim 11, further comprising the base station selecting a modulation or code rate scheme based on the future channel states predicted by the base station.

16. The method of claim 11, further comprising the base station selecting a multiple-input multiple-output multiplexing or diversity scheme based on the future channel states predicted by the base station.

17. The method of claim 11, further comprising the base station selecting a streaming or ranking scheme based on the future channel states predicted by the base station.

18. The method of claim 11, further comprising transmitting by the base station, information to specify another delay to serve as basis for generating the channel feedback information, the another delay corresponding to one or more time slots in which respective ones of the one or more future channel states are predicted.

19. A system comprising:
one or more omnidirectional antennas;
a memory;
a processor coupled to the antenna(s) and the memory; and
a communication sub-assembly coupled to the processor, configured to predict for the system one or more future channel states based on channel sounding signals received from another system through the antenna(s) and a delay specified by the another system, the delay corresponding to one or more time slots in which respective ones of the one or more future channel states are predicted, and to generate for transmission back to the another system channel feedback information, the generating being based on the predicted future channel state(s).

20. The system of claim 19, wherein the delay is about 5 milliseconds.

21. The system of claim 19, wherein the communication sub-assembly comprises one or more finite impulse response filters configured to predict the one or more future channel states.

22. The system of claim 19, wherein the communication sub-assembly comprises one or more spectral estimators configured to predict the one or more future channel states.

23. The system of claim 19, wherein one or more omnidirectional antennas comprise a plurality of omnidirectional antennas configured for multiple-input, multiple-output operation.

24. The system of claim 19, wherein the system is a selected one of a desktop computer, a laptop computer, a handheld computer, a tablet computer, a cellular telephone, a pager, an audio player, a video player, a gaming device, a video camera, a digital camera, a navigation device, a printer, a scanner, or a medical device.

* * * * *